Nov. 3, 1942.  A. W. HAYDON  2,300,785
GEAR STUD ASSEMBLY
Filed April 17, 1941     2 Sheets-Sheet 1
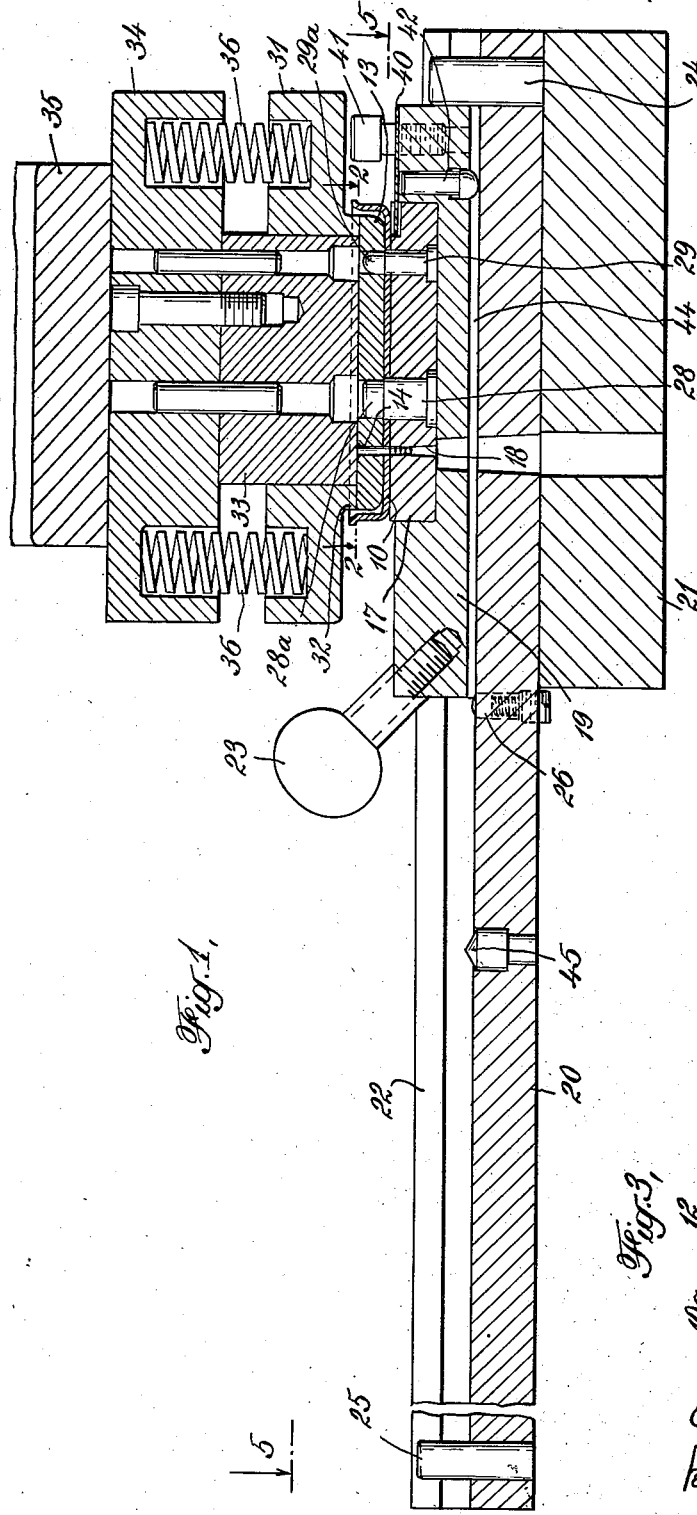
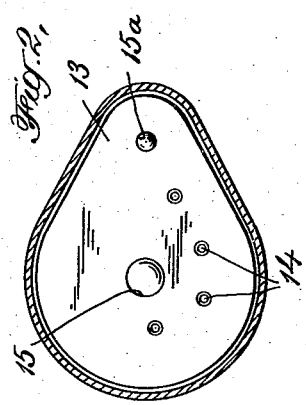
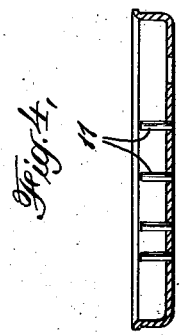
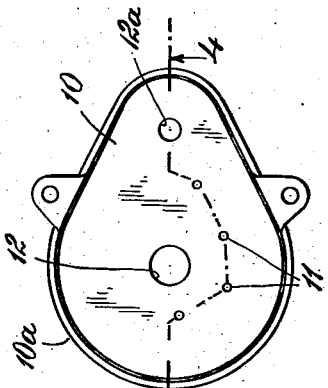
INVENTOR
Arthur W. Haydon
BY
Pennie Davis Marvin & Edmonds
ATTORNEYS Nov. 3, 1942.  A. W. HAYDON  2,300,785
GEAR STUD ASSEMBLY
Filed April 17, 1941   2 Sheets-Sheet 2
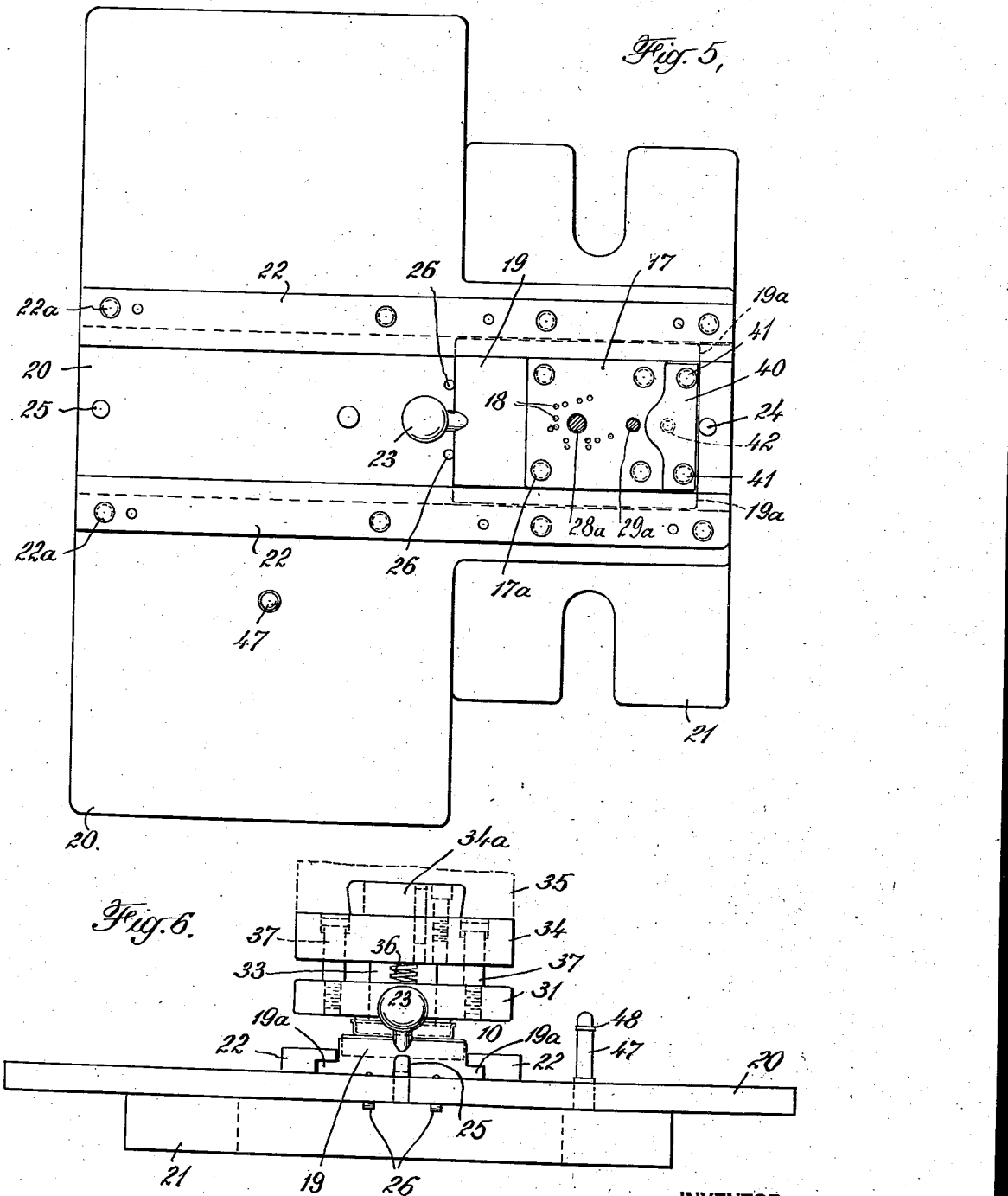

UNITED STATES PATENT OFFICE 2,300,785

GEAR STUD ASSEMBLY

Arthur William Haydon, Marion, Conn.

Application April 17, 1941, Serial No. 389,006

15 Claims. (Cl. 164—86)

This invention relates to the assembling of studs, such as gear arbors, and has particular reference to a novel method of mounting studs on a support by the practice of which they are accurately positioned relative to the support and then secured in a single operation by punching their own holes in the support and moving into the holes so that they are held rigidly in the desired locations. The new method may be practiced expeditiously and at low cost by a novel apparatus which also forms part of the invention.

For illustrative purposes the invention will be described in connection with a plurality of gear studs which are to be mounted on a plate in predetermined relative positions to support gearing for a clock mechanism or the like. It will be understood, however, that the principles of the invention are applicable to other devices in which studs or similar elements are mounted on a supporting member.

In the construction of clocks of the type employing a gear supporting plate, it has been the practice heretofore to pierce openings in the plate at predetermined locations where it is desired to mount gears, the openings being of sufficient size to receive bushings in which the gear studs are secured. The bushings are provided with reduced portions inserted through the openings and upset so as to stake the bushings to the plate. In assembling the studs in this manner, errors are frequently introduced due to shearing which sometimes occurs when the studs are mounted in the bushings, eccentricity of the center holes of the bushings relative to their reduced portions, or looseness of the bushings in the plate openings prior to the staking operations. Also, it is necessary to mount the studs in the bushings individually and stake the bushings individually to the supporting plate, and, accordingly, the operation requires considerable time and expense.

One feature of the present invention, therefore, resides in the provision of a novel method by which a stud or a group of studs may be accurately positioned on the supporting plate in a single punching operation. The new method is practiced with the use of a jig or similar device in which one or more openings are formed corresponding in number to the desired number of studs. These openings are located in the jig in predetermined positions relative to a reference on the jig, their locations corresponding to the desired locations of the studs relative to a reference on the supporting plate. The jig is mounted on one face of the plate and the plate and jig are interlocked at their respective references so that the openings in the jig overlie the desired locations of the studs on the plate. The studs are inserted in the openings in the jig, either before the jig is applied to the plate or after these parts have been interlocked, and then the ends of the studs remote from the plate are subjected to an impact, as by means of a press, to cause their opposite ends to punch holes in the plate and move into the holes. Preferably, the face of the plate remote from the jig is backed or supported around closely confined, free areas directly opposite and corresponding in area to the stud openings in the jig. Thus, when the studs are forced against the plate, the free, unsupported areas permit shearing of metal from the plate under the action of the studs, and the metal thus sheared passes through the free areas leaving holes in the plate in which the studs are held securely in the desired positions.

Another feature of the invention resides in the provision of a novel apparatus for assembling the studs on the plate quickly and accurately in accordance with my new method. An apparatus made according to the invention comprises a press and a die under the press having a seat for the stud plate. The jig for receiving and locating the studs is interlocked with the die and the plate by suitable means, as, for example, by a pin projecting upwardly from the die seat through openings in the plate and jig in which the pin is closely fitted. The die is provided with openings which, when the parts are interlocked, are aligned with the stud openings in the jig, the openings in the die being approximately of the same shape and area as the ends of the studs. The die may be arranged to slide on a track so that it is movable from a position under the press to an inoperative position remote from the press. Preferably, the press includes an outer portion which first engages the jig along its periphery to clamp the jig and plate against the die, and an inner portion which is then forced against the upper ends of the studs in the jig to punch the holes in the plate and force the studs into the holes. If desired, a stripper element may be provided on the die under part of the plate, and the stripper may be operated automatically by a cam on the track to strip the plate from the die when the latter is moved to its inoperative position.

It will be apparent that in accordance with my invention the studs are mounted accurately in position on the plate because their positions are determined by the openings in the jig which may be located with precision relative to the reference on the jig. By means of the interlock between the die, the plate and the jig at this reference, the studs in the jig openings will overlie exactly the positions on the plate where the studs are to be mounted. Accordingly, the operation of the press causes the studs to shear metal from the plate into the die openings and move into the holes thus formed, whereby the studs are secured in the desired locations on the plate.

These and other features of the invention may be better understood by reference to the accompanying drawings, in which Fig. 1 is a longitudinal, sectional view of one form of the apparatus for mounting the studs;

Fig. 2 is a sectional view on the line 2—2 of Fig. 1;

Fig. 3 is a plan view of the plate with the studs mounted on it;

Fig. 4 is a sectional view on the line 4—4 of Fig. 3;

Fig. 5 is a reduced sectional view on the line 5—5 in Fig. 1, and

Fig. 6 is a reduced end view of the apparatus shown in Fig. 1.

Referring to the drawings, the supporting plate for the studs is shown for illustrative purposes in the form of a gear cup 10 for receiving gearing driven by an electric motor, as disclosed in my copending application Serial No. 383,246, filed March 14, 1941. The gear cup has a side wall 10a and supports a series of gear studs 11 mounted directly in openings in the cup in predetermined positions relative to reference openings 12 and 12a through which operating shafts for the gearing are adapted to extend, the opening 12, as shown, being considerably larger than the opening 12a.

In its preferred form, the apparatus for mounting the studs in the gear cup comprises a jig 13 shaped to fit in the gear cup so that it is located generally by the side wall 10a. The jig 13 may be made of steel or other suitable material and is provided with a series of openings 14 corresponding in number to the desired number of studs in the gear cup, the openings 14 being of approximately the same diameter as the gear studs and being adapted to receive the studs and hold them tightly against lateral movement. If desired, the edges of the openings 14 may be beveled to facilitate insertion of the studs. The openings 14 are located in predetermined positions relative to reference openings 15 and 15a which are slightly smaller in diameter than the openings 12 and 12a, respectively, in the gear cup, the positions of the openings 14 relative to the reference openings 15, 15a being the same as the desired positions of the studs 11 relative to the reference openings 12, 12a in the final assembly. The openings 14, 15 and 15a may be located accurately in the jig by a jig boring operation.

The gear cup 10 is supported by a die 17 having a seat for the gear cup and a plurality of openings 18 extending through the die. Preferably, the die 17 is removably secured in a recess in a slide 19, as by means of screws 17a. The slide is movable longitudinally on a track plate 20 supported on a base 21 and is provided with lateral flanges 19a disposed under guide members 22 which may be secured to the track plate by screws 22a. Secured to the slide is a handle 23 by which the slide may be moved from an operative position against a stop 24 to an inoperative position against a stop 25. When the slide is in its operative position, it is held against accidental movement on the track by means of spring pressed abutments 26 projecting upwardly from the surface of the track plate.

The die, the gear cup and the jig are interlocked by suitable positioning means, which as shown, include pins 28 and 29 having heads received in recesses in the lower surface of the die. The pins are of different diameters and extend upwardly through openings in the die in which the shanks of the pins are closely fitted. Above the die seat, the pins 28 and 29 extend into the openings 12 and 12a, respectively, of the gear cup with a close fit, and at their upper ends the pins are provided with reduced portions 28a and 29a which project with a close fit into the openings 15 and 15a, respectively, in the jig. Thus, the two pins in' rlock the die, gear cup and jig in predetermined relative positions so that the openings 14 in the jig are accurately aligned with openings 18 in the die. In order to facilitate changes in the location of the studs in the gear cup, I prefer to provide a substantial number of openings 18 in the die located in different positions, whereby the locations of the studs in the gear cup may be changed by simply inserting in the gear cup a different jig having the stud openings located in the proper positions.

Directly above the die 17 in its operative position is a press which, as shown, comprises an outer clamping portion 31 having a boss 32 adapted to fit in the gear cup around the periphery of the jig 13. A punch 33 is slidably mounted in the outer portion 31 and is secured to a block 34 which, in turn, is connected in any suitable manner to a plunger 35. The clamping member 31 is normally urged downwardly relative to the punch by compression springs 36 seated in aligned recesses in the member 31 and the block 34, the downward movement of the member 31 being limited relative to the block by screws 37 slidable in the block and threaded in the part 31.

A stripper element 40 which may be a sheet of spring metal is secured to the slide 19, as by means of screws 41, and has a part disposed in a recess in the die seat under the gear cup 10. The stripper 40 is operable by a pin 42 movable vertically in the slide 19 and having a head disposed in a central, longitudinal groove 44 in the lower surface of the slide. A cam 45 is disposed on the track plate in line with the groove 44 and is adapted to engage the head of the pin 42 when the slide is moved away from the press.

In the operation of the apparatus, the slide 19 is moved to its inoperative position against the stop 25, and the gear cup is mounted on the seat of the die with the jig in the cup so that the locating pins 28 and 29 extend through the aligned openings 12, 15 and 12a, 15a, respectively, in the cup and jig. The parts are thus interlocked against relative lateral movement so that the openings 14 in the jig are accurately aligned with the desired stud locations on the gear cup and are also aligned with openings 18 in the die. The gear studs 11 are inserted in the holes in the jig, and the slide is moved to its operative position under the press against the stop 24 where it is held releasably by the spring pressed abutments 26. The plunger 35 of the press is then operated to move the boss 32 of the outer part 31 against the peripheral portion of the jig, whereby the jig and gear cup are held down against the die seat with a spring action. As the plunger 35 moves further downwardly, the springs 36 are compressed and the punch 33 engages the upper ends of the studs in the jig so as to force the studs into the plate, thereby shearing pieces of metal from the plate which fall through openings 18 in the die. The metal thus sheared leaves holes in the plate of the same diameter as the ends of the studs, and the latter are forced downwardly through the holes until the punch has finished its stroke. As shown, the openings 18 in the die increase in diameter toward the bottom of the die and open into aligned recesses in the slide 19, track plate 20 and base 21, so that the final movement of the punch forces the sheared metal from the seat of the die to the enlarged parts of the openings 18 from which it falls into a suitable receptacle.

The plunger 35 is then moved upwardly to withdraw the punch 33 and boss 32 from the jig, and the slide is returned outwardly to its inoperative position against the stop 25. In the return movement of the slide, the head of the pin 42 rides over the cam 45 on the track plate and elevates the free end of the stripper 40 so as to strip the gear cup from the die. The gear cup may then be removed from the die and the jig stripped from the gear cup. In order to facilitate stripping of the jig from the cup, it may be desirable to provide a stud 47 on the track plate having a shoulder 48 adapted to fit closely in the opening 12 of the gear cup, so that by placing this opening over the stud 47 and forcing the cup downwardly, the shoulder 48 engages the bottom of the jig around the opening 15 and forces the jig from the cup.

In accordance with my invention, the studs are prepositioned accurately with respect to the plate 10 and its reference openings 12 and 12a, by means of the jig 13 and the interlock between the jig and plate, and the studs are assembled securely in the plate by a single blow of the punch. The die 17 prevents distortion of the plate incident to operation of the punch, because the die fits closely around the metal slugs which are sheared from the plate by the ends of the studs. Accordingly, these slugs are punched cleanly from the plate so that there are practically no burrs left on its lower surface.

The studs 11 are forced through the gear cup a distance determined by the thickness of the jig 13. Preferably, the jig is made of such thickness that the studs are forced through the gear cup only a few thousandths of an inch beyond the bottom surface of the cup, this distance being only sufficient to insure that the metal slug breaks from the body of the cup. The slug is then held in the die opening and after several slugs have been driven, one on top of another, into this opening, the preceding slugs are driven into the large recess under the opening and then fall freely through the slide, the track plate and the base. The building up of these slugs in the die is advantageous because it causes a certain amount of back pressure against the gear cup as a slug is being driven through by the gear stud. This back pressure increases the force required to drive the stud into the gear cup and tends to make the metal tighter around the stud and hold the stud more securely.

In the usual form of piercing punch and die, there is clearance between the punch and the die. That is, the hole in the die is usually a few thousandths of an inch larger in diameter than the punch so as to reduce the back pressure of the slugs sufficiently to cause the metal to break after the punch has moved about half way through the plate, and from that point the hole in the plate is irregular and slightly larger in diameter than the punch. Accordingly, only about one-half of the thickness of the metal plate is tight around the punch, and the plate, therefore, does not provide substantial lateral support for the punch. In accordance with my invention, on the other hand, this back pressure of the slugs is built up considerably and the die is formed without any clearance around the punch, that is, the stud 11, so that the metal does not break freely as the stud enters the gear cup but is sheared to form a smooth straight hole through the cup with the metal tight around the stud for the entire thickness of the cup to provide the desired support for the stud.

I prefer to provide a substantial clearance between the jig and the wall of the gear cup so that there is no possibility of the jig binding against this wall and tending to displace the cup laterally. By rounding the bottom of the jig along its edges, the jig serves to locate itself generally by engagement with the walls of the cup and thereby aids the operator in positioning the jig over the two locating pins 28, 29. The rounded tops of these pins also aid in placing the jig quickly in position over the locating pins.

While the method and apparatus of my invention are adapted for various uses, they may be used to particular advantage to assemble gear studs for clock movements, etc., in which the studs must be positioned relative to one another within very close tolerances, for example, five ten-thousandths of an inch. The openings 14, 15 and 15a may be located accurately in the jig and the parts interlocked accurately in the proper relative positions by the pins 28 and 29 and the sides of the openings in which they are closely fitted, so that prior to the punching operation the studs overlie exactly their desired positions on the plate. Since the studs are mounted directly in the plate by punching their own holes, the accuracy of the assembly does not depend on the accuracy of the usual bushings or the staking of the bushings in preformed holes in the plate. By the practice of the new method, a considerable saving in labor is effected because the studs are all assembled simultaneously.

It will be understood that the relative positions in which the studs are mounted on the plate 10 may be varied by simply substituting for the jig 13 another jig in which the stud openings 14 are disposed in the desired relative positions. The die 17, as shown, is provided with a considerable number of openings 18 so that changes in the locations of the studs may be effected without substituting a new die. The die 17 may, however, be readily replaced with a different die which can be used in conjunction with a different group of jigs, by merely removing the screws 17a. Thus, the variations in the gear stud locations are unlimited.

I claim:

1. The method of mounting studs on a metal plate with the use of a jig having openings formed therein in predetermined relative positions, which comprises locating the jig in a predetermined position relative to the plate on one face thereof with the studs slidably mounted in the openings, closely confining the face of the plate remote from the jig around free spaces directly opposite to and coextensive in area with the ends of the studs, subjecting the studs simultaneously to an impact to cause the ends of the studs adjacent the plate to punch holes in the plate over said free spaces and move into the holes, and stripping the jig from the plate.

2. The method of mounting studs on a metal plate with the use of a jig having openings formed therein in predetermined positions relative to a reference on the jig, which comprises locating the jig on one side of the plate and interlocking the jig and plate at said reference and at a predetermined reference on the plate with the studs slidably mounted in said openings, subjecting the studs simultaneously to an impact to cause the ends of the studs adjacent the plate to punch holes in the plate and move into the holes, and stripping the jig from the plate.

3. The method of mounting studs on a metal plate with the use of a die and a jig having openings therein in predetermined positions relative to a reference on the jig, the die having openings in corresponding positions relative to a reference on the die, which comprises placing the plate between the die and the jig with the studs in the jig openings, interlocking the plate, die and jig through the plate at said references on the die and jig, subjecting the studs simultaneously to an impact to cause the ends of the studs adjacent the plate to punch holes in the plate and move into the holes, and stripping the jig from the plate.

4. An apparatus for mounting a stud on a plate, which comprises a jig having an opening for receiving the stud, means for interlocking the jig and plate with said opening disposed in a predetermined position relative to the plate, and a punch engageable with the end of the stud remote from the plate for causing the opposite end to punch a hole in the plate and move into the hole.

5. An apparatus for mounting a stud on a plate, which comprises a die having a seat for the plate, a jig having an opening for receiving the stud, means for interlocking the die, the plate and the jig with the plate between the die and jig and with said opening disposed in a predetermined position relative to the plate, and a punch engageable with the end of the stud remote from the plate for causing the opposite end to punch a hole in the plate and move into the hole.

6. An apparatus for mounting a stud on a plate, which comprises a die having a seat for the plate and an opening in the seat, a jig having an opening for receiving the stud, means for interlocking the die, the plate and the jig with the plate between the die and jig and with said openings in alignment, and a punch engageable with the end of the stud remote from the plate for causing the opposite end to punch a hole in the plate and move into the hole.

7. An apparatus for mounting a stud on a plate, which comprises a die having a seat for the plate, a jig having an opening for receiving the stud, means for interlocking the die, the plate and the jig with the plate between the die and jig and with said opening disposed in a predetermined position relative to the plate, a punch engageable with the end of the stud remote from the plate for causing the opposite end to punch a hole in the plate and move into the hole, and means for stripping the plate from the die.

8. An apparatus for mounting a stud on a plate, which comprises a punch, a track, a die slidable on the track between an operative position under the punch and a position remote from the punch, the die having a seat for the plate, a jig having an opening for receiving the stud, means for interlocking the die, the plate and the jig with the plate between the die and jig and with said opening disposed in a predetermined position relative to the plate, the punch being operable in said operative position of the die to engage the end of the stud remote from the plate and cause the opposite end of the stud to punch a hole in the plate and move into the hole, and means responsive to movement of the die to said remote position on the track for stripping the plate from the die.

9. An apparatus for mounting a stud on a plate, which comprises a punch, a track, a die slidable on the track between an operative position under the punch and a position remote from the punch, the die having a seat for the plate, a jig having an opening for receiving the stud, means for interlocking the die, the plate and the jig with the plate between the die and jigg and with said opening disposed in a predetermined position relative to the plate, the punch being operable in said operative position of the die to engage the end of the stud remote from the plate and cause the opposite end of the stud to punch a hole in the plate and move into the hole, a stripper element underlying the plate on the die, a cam on the track, and means engageable with the cam to actuate the stripper element and strip the plate from the die on movement of the die to said remote position on the track.

10. An apparatus for mounting a stud on a plate, which comprises a punch, a track, a slide movable on the track between an operative position under the punch and a position remote from the punch, a die mounted on the slide and removable therefrom, the die having a seat for the plate and an opening in the seat, a jig having an opening for receiving the stud, and means for interlocking the die, the plate and the jig with the plate between the die and jig and with said openings in alignment, the punch being operable in said operative position of the slide to engage the end of the stud remote from the plate and cause the opposite end of the stud to punch a hole in the plate and move into the hole.

11. An apparatus for mounting a stud on a plate, which comprises a punch, a track, a slide movable on the track between an operative position under the punch and a position remote from the punch, a die mounted on the slide and removable therefrom, the die having a seat for the plate and an opening in the seat, a jig having an opening for receiving the stud, means for interlocking the die, the plate and the jig with the plate between the die and jig and with said openings in alignment, the punch being operable in said operative position of the slide to engage the end of the stud remote from the plate and cause the opposite end of the stud to punch a hole in the plate and move into the hole, a pin slidable vertically in the slide, a stripper element on the slide having a part adapted to underlie the plate on the die and a part coacting with said element, and a cam on the track for raising the pin to operate said element and strip the plate from the die on movement of the slide to said remote position on the track.

12. An apparatus for mounting a stud on a plate, which comprises a die having a seat for the plate and an opening in the seat, a pin projecting from the seat, a jig having an opening for receiving the stud and a second opening for receiving the pin, said openings in the jig being disposed in predetermined relative positions, the pin extending through the plate into the jig to interlock the members with the plate between the die and jig and with said first opening in the jig and said die opening in alignment, and a punch engageable with the end of the stud remote from the plate for causing the opposite end to punch a hole in the plate and move into the hole.

13. An apparatus for mounting a stud on a plate, which comprises a die having a seat for the plate and an opening in the seat, a jig having an opening for receiving the stud, a pin projecting from the die seat through an opening in the plate and having a close fit in the plate opening, the pin having an end portion fitted closely in a second opening in the jig located in a predetermined position relative to said first opening in the jig, whereby the die, the plate and the jig are interlocked with said stud and die openings in alignment, and a punch engageable with the end of the stud remote from the plate for causing the opposite end to punch a hole in the plate and move into the hole.

14. An apparatus for mounting studs on a gear cup, which comprises a jig adapted to fit freely in the cup and having openings disposed in predetermined relative positions for receiving the studs, a die having a seat for the plate and openings in the seat disposed in said predetermined relative positions, means for interlocking the die, the plate and the jig with the plate between the die and jig and with each of said jig openings aligned with one of the die openings, and a punch engageable with the ends of the studs remote from the plate for causing the opposite ends to punch holes in the plate and move into the holes.

15. An apparatus for mounting studs on a gear cup, which comprises a jig adapted to fit closely in the cup and having openings disposed in predetermined relative positions for receiving the studs, a die having a seat for the plate and openings in the seat disposed in said predetermined relative positions, means for interlocking the die, the plate and the jig with the plate between the die and jig and with each of said jig openings aligned with one of the die openings, and a press including a clamping member engageable with the jig adjacent the periphery thereof, and a punch movable in the clamping member and engageable with the ends of the studs remote from the plate for causing the opposite ends to punch holes in the plate and move into the holes.

ARTHUR WILLIAM HAYDON.